United States Patent [19]

Ataee et al.

[11] Patent Number: 5,737,144
[45] Date of Patent: Apr. 7, 1998

[54] SWITCHED BOOST VOLTAGE GENERATOR FOR ACTUATOR RETRACT IN DISK DRIVE

[75] Inventors: Mehran Ataee, Cupertino; Sassan Mortazavi, San Jose, both of Calif.

[73] Assignee: Quantum Corporation, Milpitas, Calif.

[21] Appl. No.: 658,417

[22] Filed: Jun. 5, 1996

[51] Int. Cl.[6] .................................................. G11B 21/02
[52] U.S. Cl. ...................... 360/75; 360/73.03; 318/254; 318/560
[58] Field of Search ................................ 360/73.03, 75, 360/105; 318/254, 560, 439

[56] References Cited

U.S. PATENT DOCUMENTS

| | | |
|---|---|---|
| 4,371,903 | 2/1983 | Lewis . |
| 4,658,308 | 4/1987 | Sander, Jr. ........................ 360/75 X |
| 5,208,518 | 5/1993 | Grapenthin et al. . |
| 5,218,253 | 6/1993 | Morehouse et al. ................ 310/68 R |
| 5,473,238 | 12/1995 | Latham, II et al. ................ 360/75 X |
| 5,495,372 | 2/1996 | Bahlmann et al. ................ 360/75 |
| 5,633,568 | 5/1997 | Dunfield ........................ 360/73.03 X |

OTHER PUBLICATIONS

"DC-DC Converters", *The Electrical Engineering Handbook*, Dorf, Ed., CRC Press, Boca Raton, FL, ©1993, pp. 708–709.

*Primary Examiner*—Thang V. Tran
*Assistant Examiner*—James L. Habermehl
*Attorney, Agent, or Firm*—David B. Harrison

[57] ABSTRACT

A voltage boost circuit within a hard disk drive is realized by switching a center tap node of a three phase spindle motor to ground during a power down sequence, thereby employing inductance of the spindle motor as a voltage boost inductor. The boosted voltage is rectified and stored in a capacitor for use, e.g. to control a source transistor of an actuator driver during an actuator retract operation.

11 Claims, 2 Drawing Sheets

SWITCHED BOOST VOLTAGE GENERATOR FOR ACTUATOR RETRACT IN DISK DRIVE

FIELD OF THE INVENTION

The present invention relates to apparatus and method for generating a control voltage within a disk drive. More particularly, the present invention relates to a switched boost voltage generator for controlling actuator retract function during a power-down sequence in a hard disk drive.

BACKGROUND OF THE INVENTION

A hard disk drive conventionally includes at least one rotating data storage disk and a head positioner for positioning a head over each storage surface of the disk or disks. The heads typically "fly" upon an air cushion or bearing in very close proximity to their respective storage surfaces. When the disks stop rotating for whatever reason, it is desirable to move the heads to a safe location for parking on the disk surfaces or for retraction away from the disk surfaces altogether. Since the rotating disks and associated spindle have rotational mass, the rotating disk assembly has kinetic energy, once driving rotational force is removed. Accordingly, it has been proposed to convert the rotational kinetic energy into electrical energy and apply that energy to the head positioner to bring about automatic head parking. These arrangements are frequently known as "electronic return springs". One example of an electronic return spring is described at column 15, lines 24 to 68 of commonly assigned U.S. Pat. No. 4,639,863 to Harrison et al., entitled: "Modular Unitary Disk File Subsystem", the disclosure thereof being incorporated herein by reference. In that particular implementation, discrete circuit elements in parallel with motor drivers were used to switch the current from the spindle motor into the actuator to retract the head positioner. In that example, the electronic return spring returned the actuator structure to park the heads at a radially inner landing zone position of each disk.

Another example of an electronic return spring configuration is given in U.S. Pat. No. 5,218,253 to Morehouse et al., entitled: "Spin Motor for a Hard Disk Assembly". In this example, a very small disk drive, having e.g. 1.8 inch diameter disks, has proportionately less energy stored in the rotating spindle at power down. The Morehouse et al. solution was to provide multiple stator coil windings, such as bifilar or trifilar windings. When the motor is receiving energy from the power supply, only one set of windings is used. However, when the spin motor becomes a generator, the multiple winding sets are connected in series, with a resultant boosted voltage output, thereby facilitating head positioner retract including an unloading operation at the periphery of the disk stack.

It is known to employ an inductor within a step-up voltage converter which supplies a higher voltage at a load than the voltage present at a power supply source. This is one of several configurations used within so-called switching power supplies. The boost converter configuration has an inductor connected in series between the power supply source and a diode leading to the load. A storage capacitor to ground is also connected at the load. A switch, such as a power FET, is connected to shunt a node between the inductor and diode to ground. When the switch is on, current flows into the inductor and causes an electromagnetic field to build, of a magnitude dependent upon the supply voltage, inductance, and circuit time constant. When the switch is turned off, the field in the inductor collapses, inducing a reverse direction current in the windings. The reverse direction current results in a reversed polarity voltage which adds to the supply voltage. The "boosted" voltage results in a momentary current flow through the diode and into the capacitor for consumption by the load. The voltage across the capacitor is larger than the supply voltage, and is referred to as "boosted".

In order to provide miniaturization and reduce costs, it is increasingly the practice in disk drive designs to implement electrical functions in several application specific integrated circuits. One such circuit may be provided for all of the electronics associated with spindle motor and rotary voice coil motor functions within the disk drive. A motor driver chip may include areas implemented as DMOS FET power driver transistors. The drivers are commonly configured as current source and current sink switches. Current source switches implemented as enhancement mode elements require control voltages which are boosted above the nominal supply voltage that may be present across a source-drain channel. In order to control DMOS FET source transistors during power-down retract operations, a boosted control voltage is needed.

One previously unsolved need has been for a practical control voltage generator for controlling DMOS source transistors of a voice coil motor driver during actuator retract in a manner overcoming limitations and drawbacks of prior actuator retract approaches and designs.

SUMMARY OF THE INVENTION WITH OBJECTS

One object of the present invention is to provide a control voltage generator for generating a boost voltage for controlling DMOS source transistors of a voice coil motor driver during an actuator retract function when primary power is removed.

Another object of the present invention is to simplify an actuator retract circuit within a motor driver integrated circuit of a hard disk drive by providing a boost voltage generator for controlling driver transistors during the actuator retract operation.

In accordance with one aspect of the present invention, a voltage boost generation circuit within a hard disk drive includes a three-phase wye-connected DC brushless spindle motor having a center tap connection. The spindle motor functions as a generator for generating power down voltage during power-down sequences. In one preferred form the generation circuitry comprises a transistor switch having a control electrode and a controlled current channel for connecting the center tap connection to a return path relative to the power down voltage; a diode connected to the center tap connection to rectify voltages present thereon; a capacitor connected to the diode to store energy from the rectified voltages passed by the diode as a boosted voltage supply; and, an oscillator powered by the power down voltage for generating and applying an alternating control signal to the control electrode.

Preferably, the disk drive includes a voice coil motor and a driver circuit having at least one current source FET transistor having a control electrode which is controlled by voltage supplied by the boosted supply voltage during an actuator retraction operation during power-down sequences of the drive.

Also, the voltage boost generation circuit may include a boosted voltage regulator circuit connected to regulate voltage supplied from the boosted voltage supply. Further, the oscillator may comprise a voltage controlled oscillator such that a duty cycle feedback control voltage generated in relation to a magnitude of power down voltage controls the voltage controlled oscillator in order to vary a duty cycle of the alternating control signal in inverse relation to the magnitude of the power down voltage.

In accordance with another aspect of the invention, a hard disk drive has at least one rotating data storage disk. A poly-phase DC brushless spindle motor has a rotor directly coupled to rotate the disk during operational intervals when operating power is supplied to a motor driver circuit from a power supply external to the disk. The poly-phase motor also has its plural phases connected in common to a center-tap node. Within this structural environment a method generates a boost voltage during a power-down interval when operating power supplied from the external power supply is removed, by following the steps of:

periodically switching the center-tap node to a ground return path to create boosted voltage pulses from the poly-phase windings of the rotating spindle motor, passing the boosted voltage pulses unidirectionally to a storage capacitor, and storing the voltage pulses as a boosted voltage in the capacitor as a boosted voltage supply during the power-down interval.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 1:
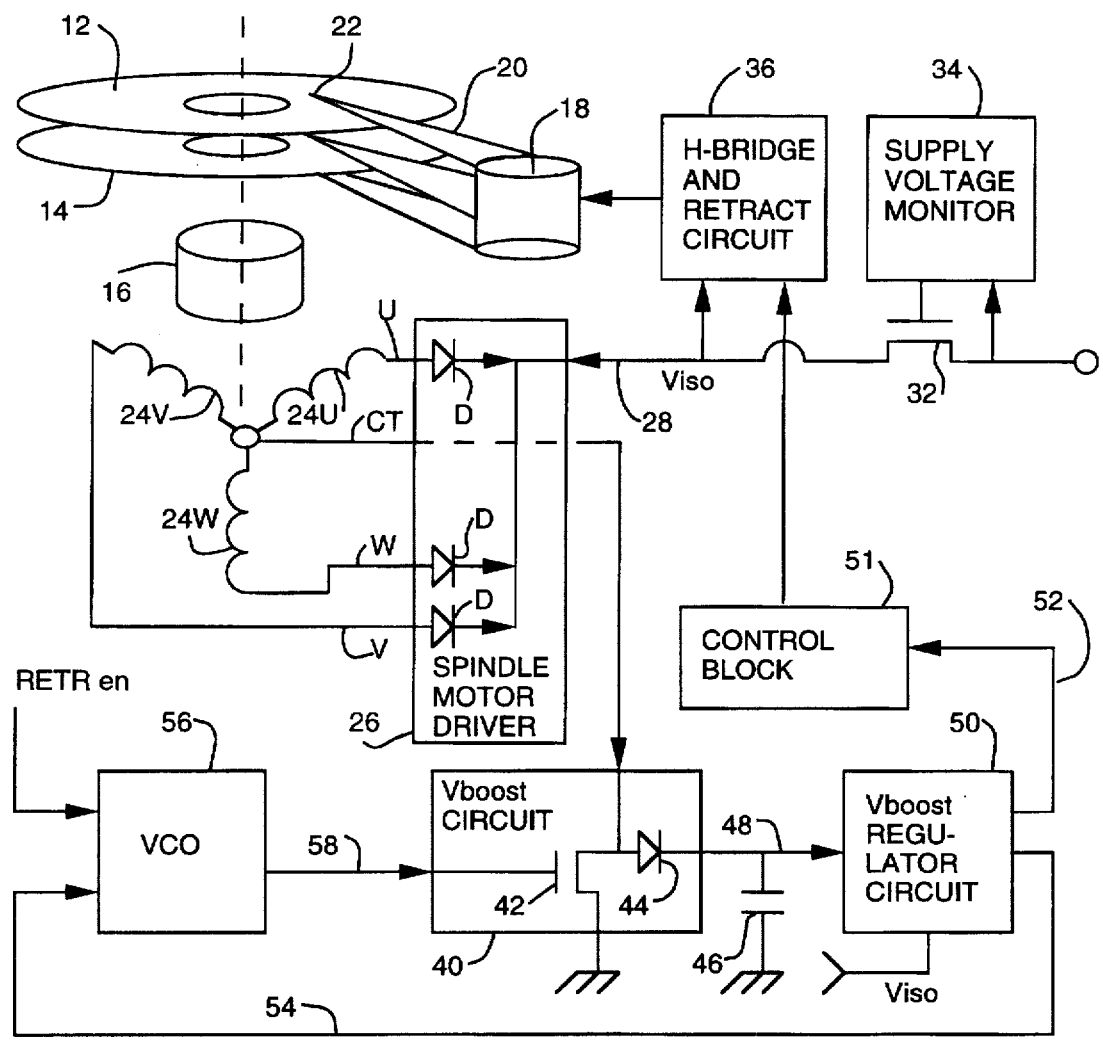
FIG. 1 is a block diagram of relevant portions of a hard disk drive having a spindle motor and VCM motor driver chip implementing a boost voltage generator for controlling the actuator retract function in accordance with principles of the present invention.

With reference to FIG. 1, a hard disk drive 10 includes e.g. two rotating data storage disks 12 and 14. The disks 12 and 14 are mounted to a spindle which is rotated at a constant predetermined angular velocity by a spindle motor 16. A rotary voice coil actuator motor (VCM) 18 positions an actuator structure 20 relative to the rotating disks 12 and 14. The actuator structure 20 positions a data transducer head assembly 22 at desired track locations defined on an associated storage surface of each disk 12, 14 in order to carry out reading and writing of user data in conventional fashion. Details of the circuitry employed for reading and writing are well understood and are not pertinent to the present invention.

The spindle motor 16 is a DC brushless motor having a rotor comprising a permanent magnet ring, and a fixed laminated stator structure which includes stator windings 24 arranged/connected into three electrical phases 24u, 24v and 24w, each phase being shifted from the others by 120 electrical degrees. These phases are wye-connected together at a center tap 24ct, as shown in FIG. 1. The motor phases 24u, v, w, and center tap 24ct are connected to a spindle motor driver circuit 26 which includes conventionally connected three-phase source and sink transistor drivers, such as DMOS field effect transistors (FET). An internal isolated power supply bus 28 provides operating power to the spindle motor driver circuit 26 from an external power supply terminal 30. An isolation pass transistor 32 is placed between the terminal 30 and the isolated bus Viso 28, and serves to disconnect and isolate the Viso bus 28 when primary power is removed from terminal 30. A monitoring circuit 34 monitors presence of voltage at the terminal 30 in order to control the isolation transistor 32.

A DMOS FET H-bridge VCM driver circuit 36 also receives power from the isolated Viso bus 28. The DMOS Flit H-bridge typically includes two pairs of current source and current sink FET drivers, with the voice coil and a sense resistor interconnecting the two pairs. One pair of drivers sources and sinks current for VCM motion in an inward radial direction relative to disks 12, 14, while the other pair of drivers sources and sinks current in an outward radial direction relative to disks 12, 14. In this manner, the VCM positions the actuator back and forth across the radial extent of the disks 12, 14.

When primary power is removed from terminal 30, as during a drive power-down sequence, transistor 32 opens and isolates the bus 28 from the external power supply at pin 30. At the same time, the spindle motor 16 becomes a generator, and rotational energy of the disks 12, 14 is converted into electrical currents in windings 24u, 24v and 24w. These alternating currents are rectified by inherent diodes D present in the motor driver FET within the motor driver circuit 26. Direct current is passed onto the isolated bus 28 from the diodes D. This current is then sourced and sinked by one of the transistor pairs of the H-bridge driver circuit 36 to move the actuator 20 to position the heads 22 at e.g. a radially inward parking or landing zone of the disks 12, 14. Since the source FET transistor of the selected transistor pair of the VCM driver circuit 36 is an enhancement mode device, a boosted control voltage is needed positively to control this transistor during the power-down actuator retract function.

In accordance with principles of the present invention, a voltage boost circuit 40 essentially comprises a field effect transistor 42 connected to shunt the center tap 24ct of the spindle motor 16 to ground in accordance with a control present at a control gate electrode. A diode 44 rectifies the current present at the center tap 24ct and an off-chip storage capacitor 46 accumulates and smoothes the boosted voltage on a path 48.

A voltage regulator circuit 50 may also preferably be provided to regulate the boosted control voltage on the path 48 in order to supply other circuitry via e.g. a control block 51 with controlled potentials during the power down sequence, such as digital registers and control logic. The boosted control voltage on the bus 52 provides the user with a number of power-down circuit control options via the block 51. For example, a very accurate band-gap reference may be provided. Control values written into dynamic registers of the motor chip may be maintained during the power-down sequence, or whenever power is momentarily lost. Also, by having a boosted control voltage present, unwanted current carrier injection at the spindle FET drivers may be prevented by rendering the source-drain channel a resistor and by negating the source-to-drain intrinsic diode without having to embed special guard rings or bands around the FET within the semiconductor substrate of the driver circuit chip. While a separated control block 51 is illustrated for clarity, in practice the separate control voltage functions are preferably implemented within the regulator circuit 50.

A feedback control voltage on a path 54 from the regulator circuit 50 is also provided to control a voltage controlled oscillator (VCO) 56. This feedback control voltage is a function of the potential present on the isolated bus Viso 28. If the Viso voltage is high, the current passing through the motor windings will also be high. Accordingly, the VCO period is set to be very short, V=Ldi/dt, so as to prevent the rise of current to be too high. As Viso decays during the retract operation, the duty cycle of the VCO 56 is increased to increase the amount of current drawn from the motor windings 24.

The VCO 56 oscillations are applied over a path 56 to the control gate electrode of the boost transistor 42. Those skilled in the art will appreciate that by periodically grounding and ungrounding the center tap 24ct of the spindle motor windings 24, a voltage fly-back or kick back (boosted) voltage will be present at the center tap 24ct. When the center tap 24ct is grounded, a more direct ground return path is provided to the motor windings and additional energy is stored in the windings 24. When the center tap 24ct is ungrounded, the additionally stored energy adds as an additive voltage to an average of one half the peak to peak voltages of the windings 24u, 24v, and 24w present at the center tap 24ct, and this boosted voltage then passes unidirectionally through the diode 44 and into the capacitor 46 for storage as a boosted voltage supply.

In other words, the voltage boost circuit 40 operates as a boost converter or step-up converter to take advantage of voltage kick back from the windings of the motor 16 and thereby boost the voltage present at the center tap 24ct. The resultant boosted voltage thereby provides a control potential suitable for controlling the source FET of the VCM driver during the retract operation.

Figure 2:
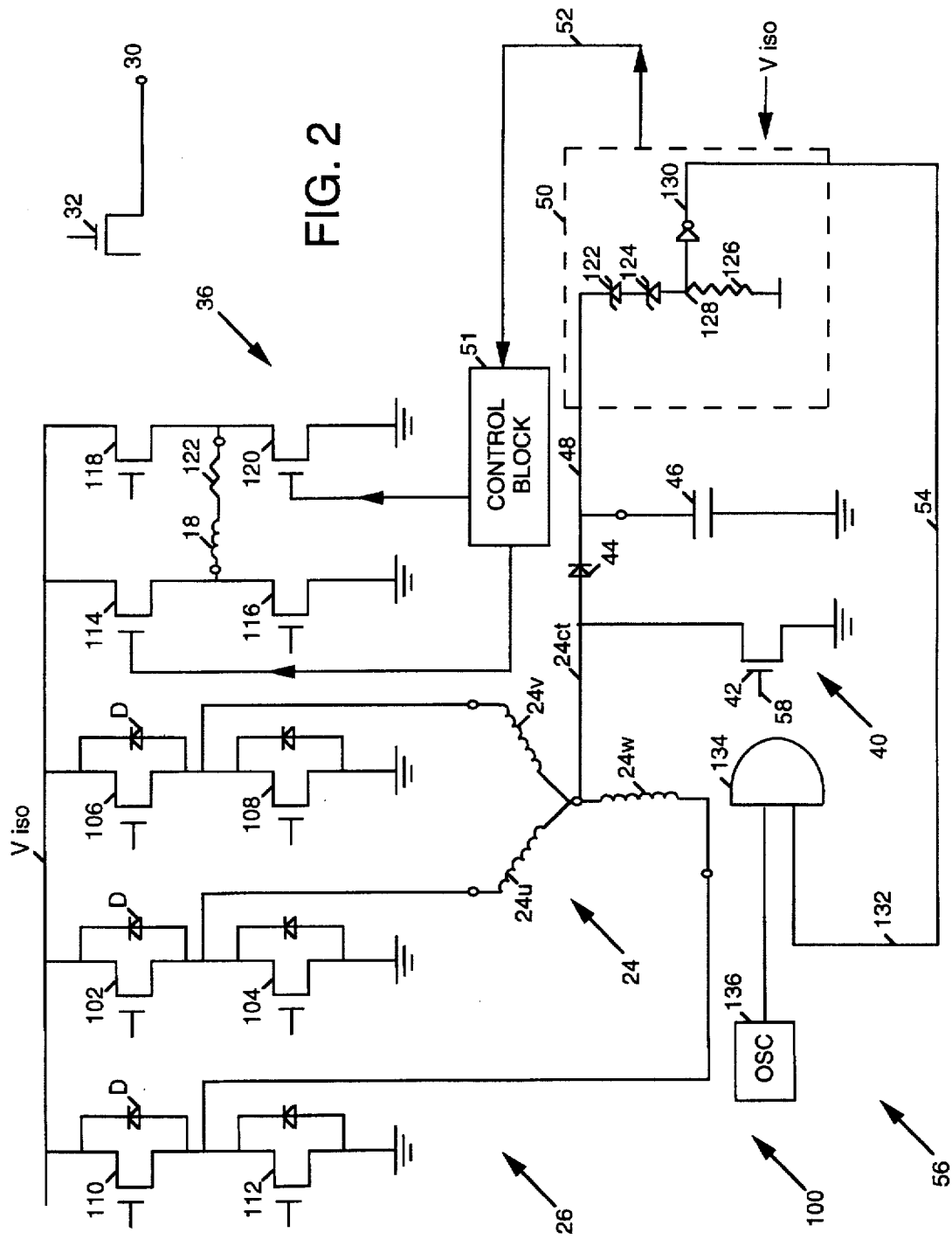
FIG. 2 is a more detailed circuit schematic diagram of the boost voltage generator circuit depicted in FIG. 1.

The FIG. 2 schematic diagram presents further details regarding a preferred implementation of the present invention. A motor driver chip 100 essentially includes the FIG. 1 circuitry, except for the spindle motor windings 24, the VCM 18 and the boost voltage storage capacitor 46. The spindle motor driver circuit 26 includes six DMOS FET driver transistors 102, 104, 106, 108, 110, and 112, arranged as three source-sink pairs. Transistors 102, 106 and 110 are current sources, connected to the isolated voltage supply Viso. Transistors 104, 108 and 112 are sink transistors, connected to return current to a ground path. Transistors 102 and 104 selectively source and sink current at motor winding 24u. Transistors 106 and 108 selectively source and sink current at motor winding 24v. Transistors 110 and 112 selectively source and sink current at motor winding 24w. The logic circuitry for controlling the gate electrodes of transistors 102–112 is conventional, and not particularly pertinent to the present invention, and is therefore omitted from the FIG. 2 illustration.

The H-bridge VCM driver circuit 36 includes two pairs of source and sink transistors, a first pair 114 and 116, and a second pair 118 and 120. The voice coil of motor 18 and a sense resistor 122 are connected across the two pairs of driver transistors. During retract operations, when the actuator structure 20 is being moved to the landing zone at an inner radius of the disks 12 and 14, only source transistor 114 and sink transistor 120 are conducting. As explained above, during the power-down sequence, the Viso supply bus is disconnected by pass transistor 322 from the external power supply 32. Voltage induced by residual disk rotation in the three phase windings 24u, 24v and 24w is rectified by intrinsic diodes D of transistors 102, 106 and 110 and passed onto the isolated bus Viso. The control electrode of source transistor 114, being an enhancement mode DMOS FET, receives the boosted voltage on the path 48 from the voltage boost circuit 40 and thereupon positively turns on, passing current from the Viso bus into the voice coil of VCM 18. A ground return path is provided by turning sink transistor 120 on, also (although not necessarily) with the boosted control voltage on path 48. Alternatively, a variable control voltage may be applied to the control gate of sink transistor 120 in order to control more accurately a seek trajectory of the actuator structure 18 to the landing zone during the actuator retract portion of the power down sequence.

FIG. 2 also provides some further details relating to the regulator circuit 50 and the oscillator 56. In pertinent part the regulator circuit 50 may include e.g. two voltage reference diodes 122 and 124 connected in series between the boosted voltage supply path 48 and a node 128. A resistor 126 connects between the node 128 and a ground return path. The diodes 122 and 124 and resistor 126 provide a scaling function for monitoring the boost voltage magnitude at path 48. A logic inverter 130 (with suitably built-in hysteresis) has e.g. a nominal threshold voltage. When the voltage at node 128 is above the inverter threshold voltage, the inverter output is low. However, when the voltage at node 128 is below the inverter threshold voltage, the inverter output is high. This logical condition is presented on a feedback path 132 to one input of e.g an AND gate 134 having an output providing control path 58 to control the switching transistor 42 of the boost generator circuit 40. Another input to the AND gate 134 comes from a free-running oscillator 136. When the logical condition on the path 132 is high (meaning that the boost voltage 48 has fallen below a reference level), the oscillator 136 is enabled and turns the transistor 42 on and off in order to generate the boosted voltage. However, when the logical condition on the path 132 is low (meaning that the boost voltage 48 is above the reference level), the oscillator 136 is disabled. The result is that the oscillator circuit 56 operates with a variable duty cycle in accordance with monitored boost voltage level on the feedback path 132.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. In a hard disk drive including at least one rotating data storage disk, a poly-phase DC brushless spindle motor having a rotor directly coupled to rotate the disk during operational intervals when operating power is supplied to a motor driver circuit from a power supply external to the disk, the poly-phase motor having plural phases connected in common to a center-tap node, a method for generating a boost voltage during a power-down interval when operating power supplied from the external power supply is removed, comprising the steps of:

periodically switching the center-tap node to a ground return path to create boosted voltage pulses from the poly-phase windings of the rotating spindle motor, passing the boosted voltage pulses unidirectionally to a storage capacitor, and storing the voltage pulses as a boosted voltage in the capacitor as a boosted voltage supply during the power-down interval.

2. The method set forth in claim 1 wherein the hard disk drive further comprises a rotary voice coil head positioner having a voice coil motor for positioning data transducer heads relative to storage locations on planar surfaces of the disk, and a voice coil motor driver circuit for operating the voice coil motor during the operational intervals, and wherein the method comprises the further steps of:

applying power generated by the motor from continued rotation of the disk rotor during the power-down interval via the motor driver circuit to the voice coil motor driver circuit to retract the heads to a head parking position, and applying the boosted voltage stored in the capacitor to a control electrode of a source transistor of the voice coil motor driver circuit to control voice coil motor actuator direction during head retraction.

3. The method set forth in claim 1 comprising the further step of passing the boosted voltage through a voltage regulator circuit to develop a regulated voltage during the power-down interval.

4. The method set forth in claim 1 wherein the step of periodically switching the center-tap node to a ground return path comprises the steps of:

generating a switching signal with a voltage controlled oscillator, and controlling with the switching signal a gate electrode of a transistor for switching the center-tap node to the ground return path.

5. The method set forth in claim 4 comprising the further step of controlling a duty cycle of the voltage controlled oscillator in relation to a magnitude of the boosted voltage stored in the capacitor.

6. The method set forth in claim 4 comprising the further step of controlling a duty cycle of the voltage controlled oscillator in relation to a load connected to the capacitor to receive the boosted voltage.

7. Voltage boost generation circuitry within a hard disk drive including a three-phase wye-connected DC brushless spindle motor having a center tap connection, the spindle motor functioning as a generator for generating power down voltage during power-down sequences, the generation circuitry comprising:

a transistor switch having a control electrode and a controlled current channel for connecting the center tap connection to a return path relative to the power down voltage, a diode connected to the center tap connection to rectify voltages present thereon, a capacitor connected to the diode to store energy from the rectified voltages passed by the diode as a boosted voltage supply, and oscillator means powered by the power down voltage for generating and applying an alternating control signal to the control electrode.

8. The voltage boost generation circuitry within a hard disk drive set forth in claim 7 and further including a voice coil motor and driver circuit, the driver circuit including at least one source transistor having a control electrode controlled by voltage supplied by the boosted supply voltage during an actuator retraction operation during power-down sequences.

9. The voltage boost generation circuitry within a hard disk drive set forth in claim 7 and further including a boosted voltage regulator circuit connected to regulate .voltage supplied from the boosted voltage supply.

10. The voltage boost generation circuitry within a hard disk drive set forth in claim 7 wherein the oscillator means comprises a voltage controlled oscillator and further including a duty cycle feedback control voltage generated in relation to a magnitude of power down voltage for controlling the voltage controlled oscillator to vary a duty cycle of the alternating control signal inversely relative to the magnitude of the power down voltage.

11. The voltage boost generation circuitry within a hard disk drive set forth in claim 7 wherein the transistor switch, diode and oscillator means are formed within a motor driver chip which also includes a spindle motor driver circuit and a voice coil motor driver circuit.

* * * * *